(12) United States Patent
Nagashiki

(10) Patent No.: US 11,530,029 B2
(45) Date of Patent: Dec. 20, 2022

(54) SHOCK WAVE SUPPRESSION DEVICE AND AIRCRAFT

(71) Applicant: MITSUBISHI HEAVY INDUSTRIES, LTD., Tokyo (JP)

(72) Inventor: Mayuko Nagashiki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 23 days.

(21) Appl. No.: 17/155,491

(22) Filed: Jan. 22, 2021

(65) Prior Publication Data

US 2021/0253226 A1 Aug. 19, 2021

(30) Foreign Application Priority Data

Feb. 19, 2020 (JP) .............................. JP2020-026257

(51) Int. Cl.
*B64C 23/04* (2006.01)

(52) U.S. Cl.
CPC .......... *B64C 23/04* (2013.01); *B64C 2230/06* (2013.01); *B64C 2230/10* (2013.01)

(58) Field of Classification Search
CPC .. B64C 23/04; B64C 2230/06; B64C 2230/10
See application file for complete search history.

(56) References Cited

U.S. PATENT DOCUMENTS

| | | | | |
|---|---|---|---|---|
| 3,158,338 A | * | 11/1964 | Cushman | B64C 27/467 416/101 |
| 5,433,404 A | * | 7/1995 | Ashill | B64C 3/48 244/200 |
| 9,334,045 B2 | * | 5/2016 | Wood | B64C 23/04 |
| 2010/0301171 A1 | * | 12/2010 | Wood | B64C 23/04 244/200 |
| 2010/0308176 A1 | * | 12/2010 | Wood | B64C 23/04 244/200 |
| 2011/0042524 A1 | * | 2/2011 | Hemmelgarn | B64C 3/48 244/203 |

FOREIGN PATENT DOCUMENTS

| | | |
|---|---|---|
| EP | 2 562 080 | 2/2013 |
| EP | 2 250 085 | 8/2015 |
| EP | 2 250 088 | 1/2016 |

(Continued)

OTHER PUBLICATIONS

Extended European Search Report dated Jun. 22, 2021 in European Patent Application No. 21153194.2.

*Primary Examiner* — Justin M Benedik
(74) *Attorney, Agent, or Firm* — Wenderoth, Lind & Ponack, L.L.P.

(57) ABSTRACT

A shock wave suppression device is configured to suppress a shock wave generated on a blade surface of a blade, the shock wave suppression device including a bump cover provided to follow the blade surface and deformable to protrude outward from the blade surface, and a displacing unit configured to displace the bump cover between a steady state to follow the blade surface and a deformed state to protrude outward from the blade surface. The bump cover has a curved shape in the deformed state configured to be a continuous surface from an upstream side to a downstream side in a flow direction of a fluid on the blade surface.

20 Claims, 9 Drawing Sheets

(56) References Cited

FOREIGN PATENT DOCUMENTS

| | | | |
|---|---|---|---|
| GB | 2 296 696 | 7/1996 | |
| GB | 2296696 A * | 7/1996 | ............. B64C 23/00 |
| JP | 2011-513116 | 4/2011 | |
| JP | 5478516 | 4/2014 | |
| JP | 5478517 | 4/2014 | |

\* cited by examiner

SHOCK WAVE SUPPRESSION DEVICE AND AIRCRAFT

CROSS-REFERENCE TO RELATED APPLICATIONS

This application claims the benefit of priority to Japanese Patent Application Number 2020-026257 filed on Feb. 19, 2020. The entire contents of the above-identified application are hereby incorporated by reference.

TECHNICAL FIELD

The disclosure relates to a shock wave suppression device and an aircraft.

RELATED ART

A shock bump for inducing a smeared shock foot with a lambda waveform pattern for a shock generated on a surface of an aerodynamic structure are known conventionally (for example, see JP 2011-513116 T). The shock bump is provided to protrude from a surface of a blade, which is the surface of the aerodynamic structure.

SUMMARY

The shock bump according to JP 2011-513116 induces the smeared shock foot with a lambda waveform pattern, so that a drag increase (an increase in the drag coefficient CD) on a blade surface due to the generation of a shock wave is suppressed. However, the drag reduction by the shock bump exerts an effect within a range of a predetermined lift coefficient CL. That is, the shock bump causes a drag increase on the blade surface outside the range of the predetermined lift coefficient CL.

Thus, an object of the present disclosure is to provide a shock wave suppression device and an aircraft capable of suitably reducing the drag on the blade surface.

The shock wave suppression device according to the present disclosure is a shock wave suppression device for suppressing a shock wave generated on a blade surface of a blade, the shock wave suppression device including: a bump cover provided to follow the blade surface and being deformable to protrude outward from the blade surface; and a displacing unit configured to displace the bump cover between a steady state to follow the blade surface and a deformed state to protrude outward from the blade surface.

The aircraft of the present disclosure includes a fuselage, a blade body provided to the fuselage, and the above-described shock wave suppression device provided to the blade surface of the blade body.

According to the present disclosure, the drag on the blade surface can be suitably reduced.

BRIEF DESCRIPTION OF DRAWINGS

The disclosure will be described with reference to the accompanying drawings, wherein like numbers reference like elements.

DESCRIPTION OF EMBODIMENTS

Detailed descriptions will be given below of embodiments according to the present disclosure on the basis of the drawings. Note that, the invention is not limited to the embodiments. Further, the constituent elements in the following embodiments include those that can be easily replaced by a person skilled in the art or those that are substantially the same. Further, the constituent elements described below can be combined as appropriate, and in case of a plurality of embodiments, the embodiments can be combined with one another.

First Embodiment

A shock wave suppression device 10 according to the first embodiment is provided, for example, on a main wing 3 of an aircraft 1, and is provided to a blade surface of the main wing 3, in particular, on an upper blade surface that is the low pressure side. First, with reference to FIG. 1, description is made of the aircraft 1.

Aircraft

Figure 1:
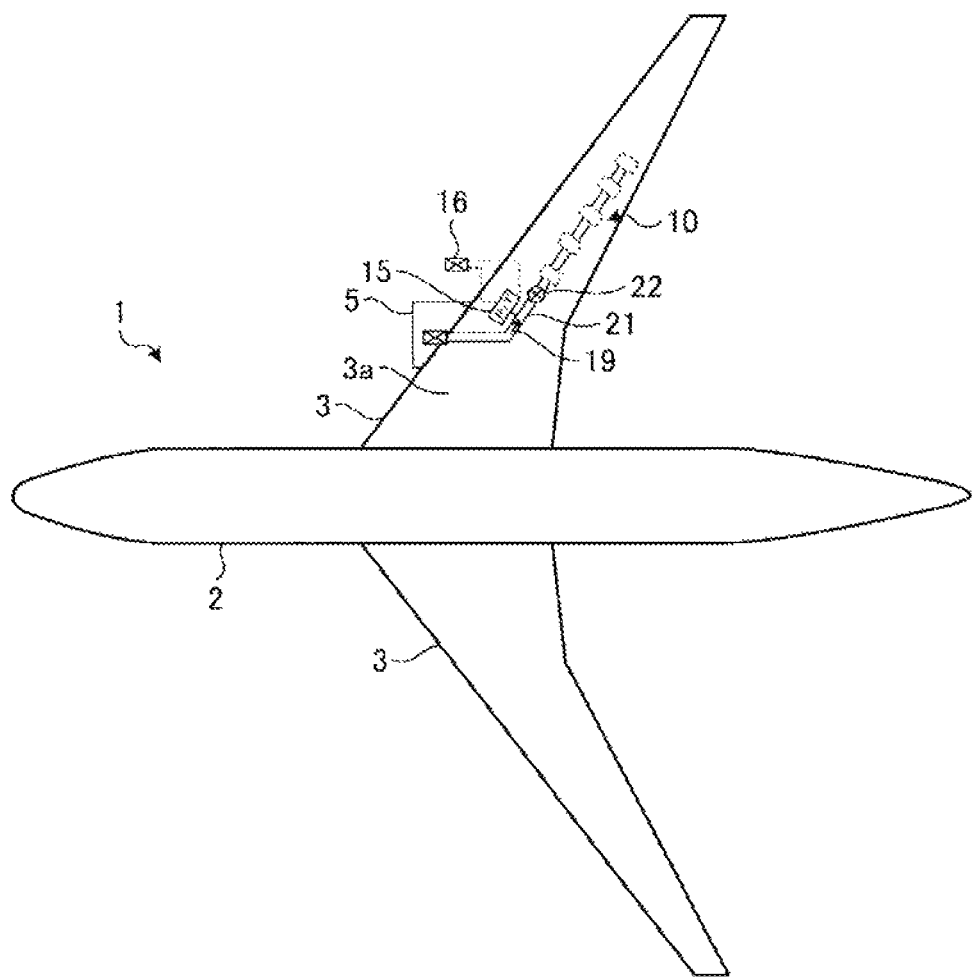
FIG. 1 is a schematic view of an aircraft provided with a shock wave suppression device according to a first embodiment.

FIG. 1 is a schematic view of an aircraft provided with the shock wave suppression device according to the first embodiment. The aircraft 1 includes a fuselage 2, a main wing 3, a horizontal tail and vertical tail (not illustrated), a gas turbine engine 5, and the shock wave suppression device 10.

The fuselage 2 is provided to extend along the roll axis direction connecting a nose and a tail. The fuselage 2 is formed in a cylindrical shape having the roll axis as a center. The main wing 3 includes blades provided to protrude to both outsides at a center of the roll axis direction of the fuselage 2 in a pitch axis direction orthogonal to the roll axis direction. The horizontal tail and the vertical tail are provided on the tail side of the fuselage 2. The gas turbine engine 5 is provided on the lower surface side of the main wing 3. As will be described in detail below, in the gas turbine engine 5, an extracted heating fluid serves as a heat source of the shock wave suppression device 10. Note that the heating fluid may be compressed air compressed in a compressor provided to the gas turbine engine 5, or may be an exhaust gas exhausted from a turbine provided to the gas turbine engine 5.

Shock Wave Suppression Device

Figure 2:
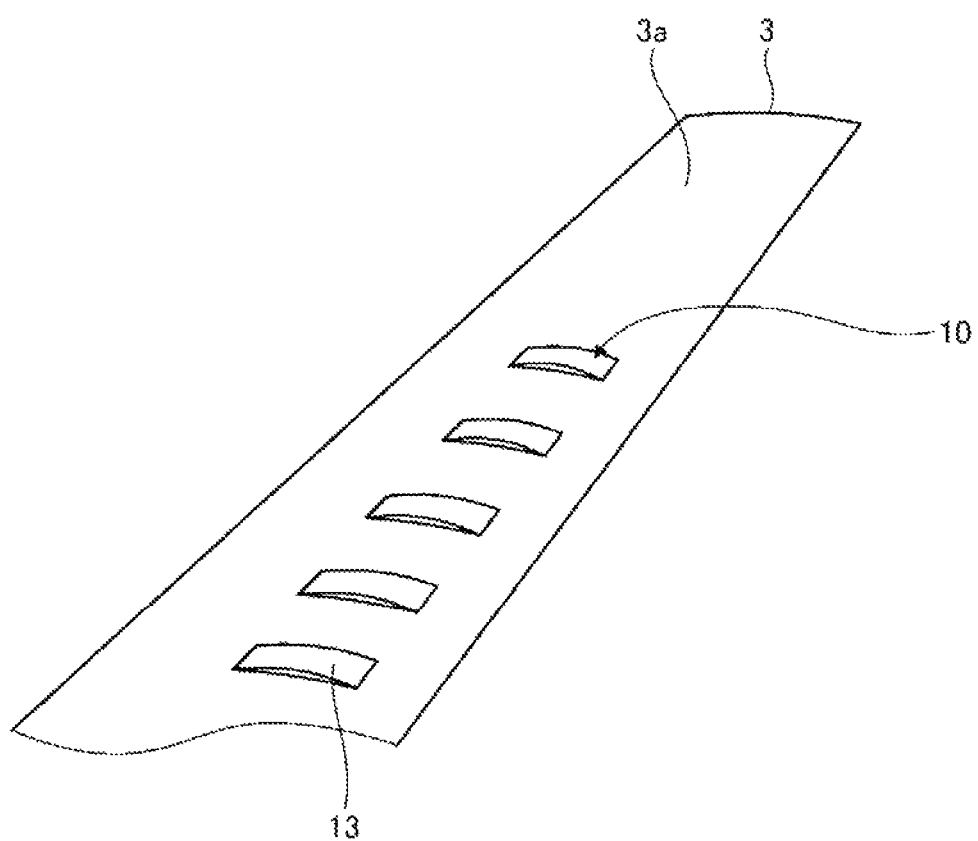
FIG. 2 is a perspective view of the shock wave suppression device according to the first embodiment.
Figure 3:
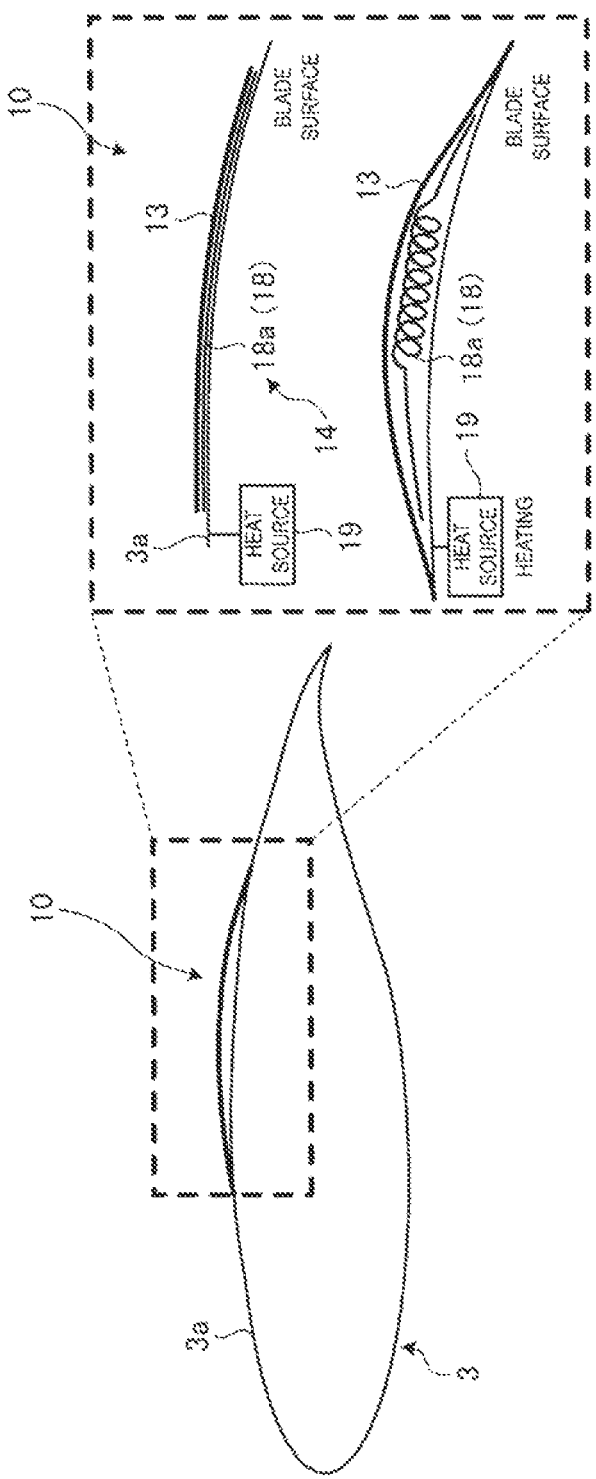
FIG. 3 is a cross-sectional view schematically illustrating an example of the shock wave suppression device according to the first embodiment.
Figure 4:
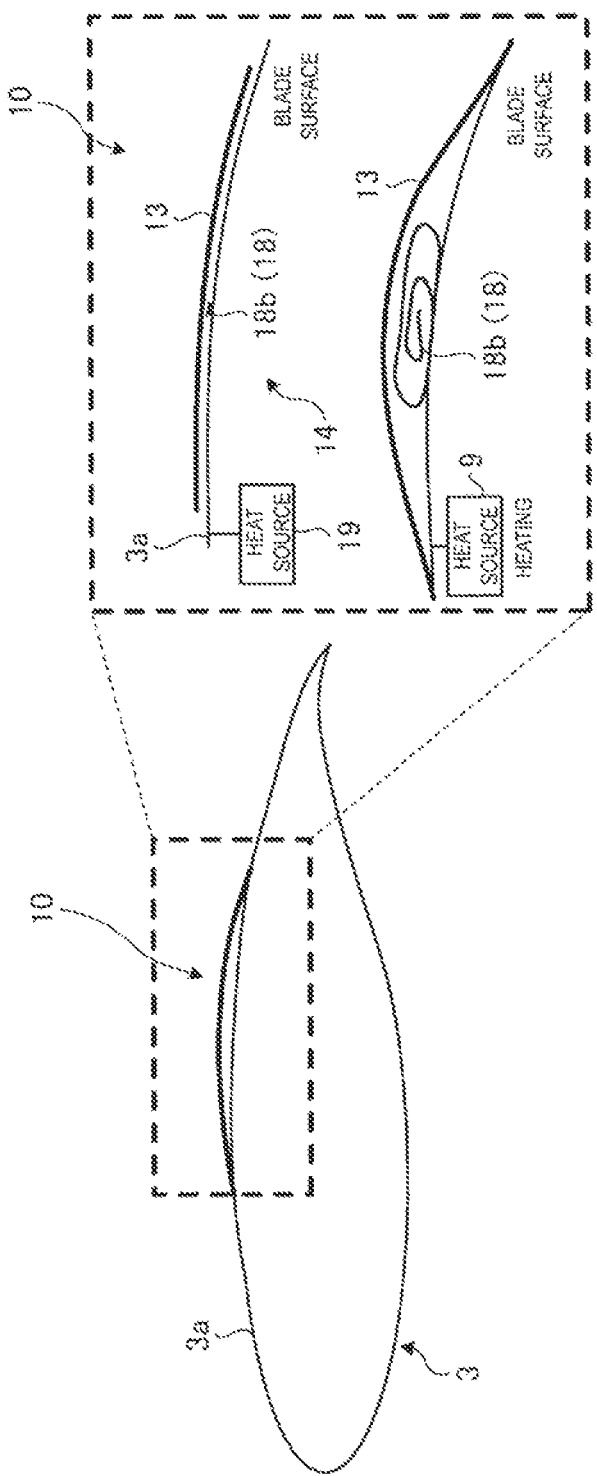
FIG. 4 is a cross-sectional view schematically illustrating an example of the shock wave suppression device according to the first embodiment.
Figure 5:
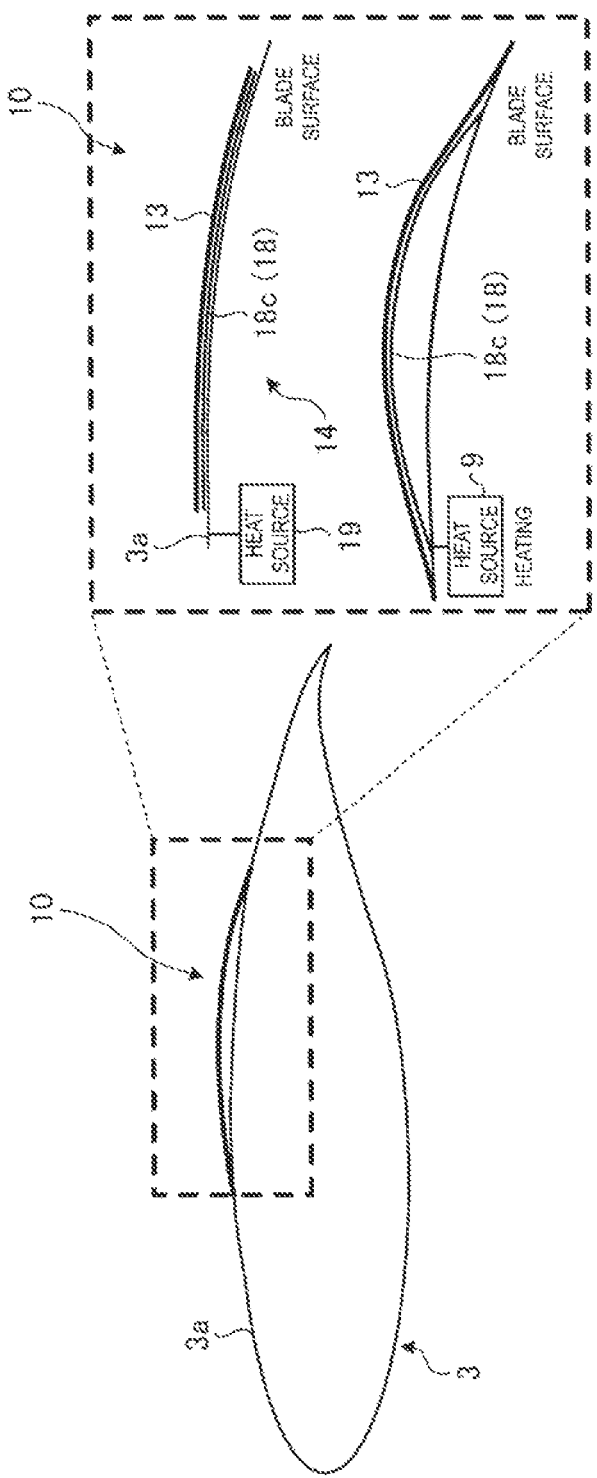
FIG. 5 is a cross-sectional view schematically illustrating an example of the shock wave suppression device according to the first embodiment.
Figure 6:
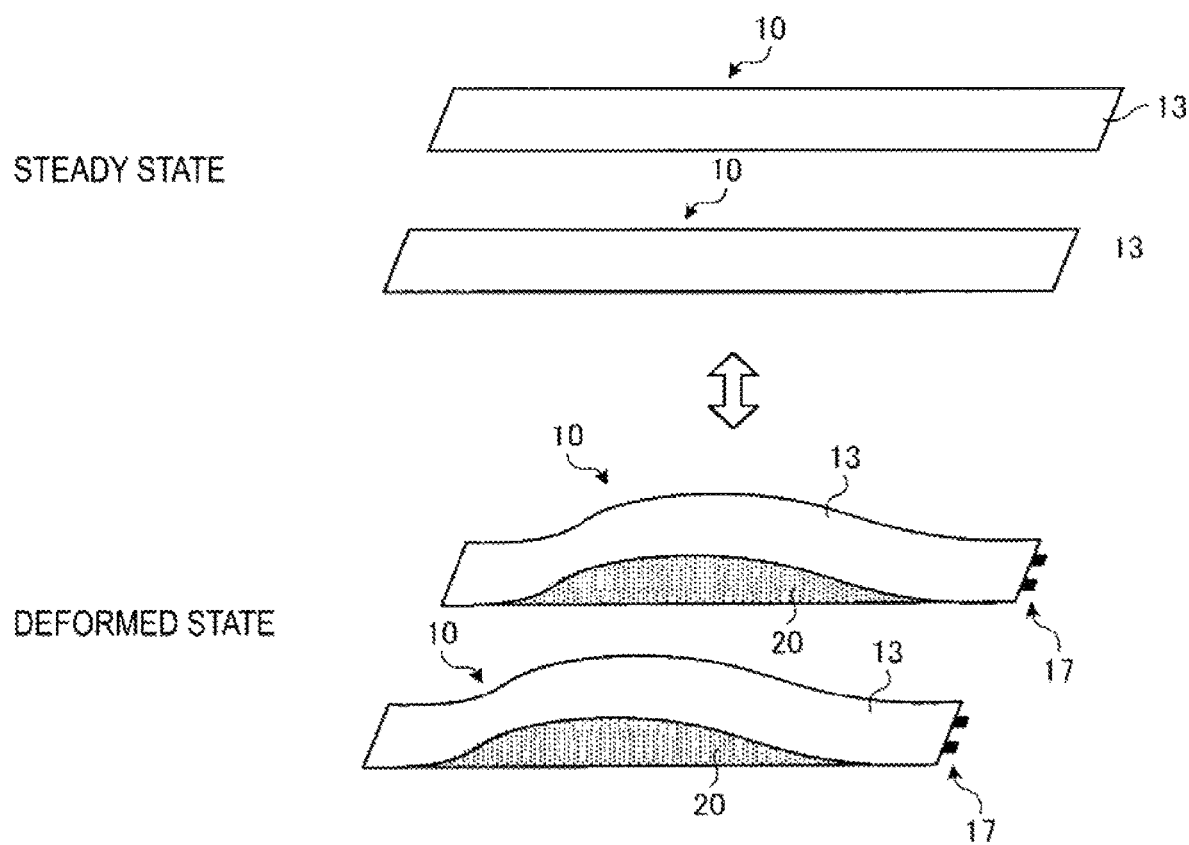
FIG. 6 is an explanatory view illustrating a transformation of states of the shock wave suppression device according to the first embodiment.

Next, the shock wave suppression device 10 will be described with reference to FIGS. 1 to 6. FIG. 2 is a perspective view of a shock wave suppression device according to the first embodiment. FIGS. 3 to 5 are cross-sectional views schematically illustrating examples of shock wave suppression devices according to the first embodiment. FIG. 6 is an explanatory view illustrating a transformation of states of a shock wave suppression device according to the first embodiment.

As illustrated in FIG. 2, the shock wave suppression device 10 is provided to the upper blade surface 3a that is the low pressure side of the main wing 3. A plurality of the shock wave suppression devices 10 is provided side-by-side at a predetermined interval in a blade longitudinal direction connecting a base end and a leading end of the main wing 3.

As illustrated in FIG. 3, the shock wave suppression device 10 includes a bump cover 13 provided to follow the upper blade surface 3a, and a displacing unit 14 configured to displace the state of the bump cover 13. Further, the shock wave suppression device 10 includes a temperature pressure sensor 15 and a control unit 16.

The bump cover 13 is a plate material using an elastic alloy. The elastic alloy is a metal configured to deform by an elastic strain amount of 1% or greater without phase transformation, and includes a superelastic alloy. The bump cover 13 is provided from the leading edge side to the trailing edge side of the main wing 3. Here, the upstream side in the flow direction of a fluid passing through the main wing 3 is the leading edge side and the downstream side is the trailing edge side. The direction connecting the leading edge side and the trailing edge side is the blade width direction. The bump cover 13 is a plate capable of elastically deforming within a range of from 10% to 60% with respect to a length in the blade width direction.

As illustrated in FIG. 6, the bump cover 13 has a shape in a state before deformation, that is, in a steady state, the shape being configured to follow the upper blade surface 3a. On the other hand, the bump cover 13 has a shape in a state after deformation, that is, in a deformed state, the shape being configured to protrude to the outside of the upper blade surface 3a. Specifically, the bump cover 13 has a curved shape in the deformed state configured to be a continuous surface from the leading edge side to the trailing edge side. Here, since the bump cover 13 is elastically deformed in deformed state, it has a restoring force for returning to the steady state.

As illustrated in FIG. 6, in the bump cover 13, the leading edge side is fixed to the upper blade surface 3a, and the trailing edge side is connected to the upper blade surface 3a via a sliding mechanism unit 17. The sliding mechanism unit 17 is, for example, a linear slider provided to extend with the blade width direction being a moving direction. The sliding mechanism unit 17 allows the bump cover 13 to be deformed by the trailing edge side of the bump cover 13 moving to follow the deformation of the bump cover 13.

On both sides in the blade longitudinal direction of the bump cover 13, occlusion members 20 are provided to occlude a gap between the bump cover 13 in the deformed state and the upper blade surface 3a. The occlusion member 20 may be configured to follow the deformation of the bump cover 13, and is, for example, a rubber packing, a rubber sheet, a shape memory film, and a deformable metal shield.

As illustrated in FIGS. 3 to 5, the displacing unit 14 displaces the bump cover 13 between the steady state and the deformed state. The displacing unit 14 includes a push-up member 18 configured to deform the bump cover 13, and a heat source 19 configured to heat the push-up member 18.

The push-up member 18 has a configuration to include a shape memory material configured to deform by being heated. The shape memory material is, for example, a shape memory alloy or a shape memory polymer. The push-up member 18 deforms toward the outside of the upper blade surface 3a by being heated, so that the bump cover 13 becomes in the deformed state. On the other hand, the push-up member 18 transforms to a shape before the deformation by being cooled to allow the bump cover 13 to be the steady state.

The heat source 19 heats the push-up member 18, and as described above, the heating fluid extracted from the gas turbine engine 5 is used. Specifically, as illustrated in FIG. 1, the heat source 19 includes an air extraction line 21 connected to the gas turbine engine 5, and an on-off valve provided to the air extraction line 21. The heating fluid extracted from the gas turbine engine 5 flows through the air extraction line 21. The on-off valve 22 in the valve-on state allows for the flow of the heating fluid from the air extraction line 21 to the push-up member 18, so that the push-up member 18 is heated. On the other hand, the on-off valve 22 in the valve-off state restricts the flow of the heating fluid from the air extraction line 21 to the push-up member 18, so that the heating to the push-up member 18 is stopped. Note that the heat source 19 is not particularly limited to the above, and for example, a heating device such as a heater may be applied.

Examples of the push-up member 18 will now be described with reference to FIGS. 3 to 5. A push-up member 18a illustrated in FIG. 3 has a coil shape after deformation deformed by being heated with the heat source 19. Furthermore, the push-up member 18a is in an unjoined state with respect to the bump cover 13.

A push-up member 18b illustrated in FIG. 4 has a spiral shape after deformation deformed by being heated with the heat source 19. The push-up member 18b is formed in the spiral shape, for example, by winding a plate-shaped member of the shape memory alloy. Similar to the push-up member 18a, the push-up member 18b is in an unjoined state with respect to the bump cover 13.

A push-up member 18c illustrated in FIG. 5 has a shape after deformation deformed by being heated with the heat source 19, the shape being configured to follow a surface on the inside of the protruding bump cover 13. The push-up member 18c has a plate shape configured to be joined to the surface on the inside of the bump cover 13.

As illustrated in FIG. 1, the temperature pressure sensor 15 is a sensor configured to detect the temperature and the pressure of the heating fluid flowing through the air extraction line 21. The temperature pressure sensor 15 may include a temperature sensor and a pressure sensor that are integrated or separated. The temperature pressure sensor 15 is connected to the control unit 16, and outputs information regarding the temperature and the pressure to the control unit 16.

The control unit 16 includes an integrated circuit such as a Central Processing Unit (CPU), The control unit 16 is connected to the displacing unit 14 and the temperature pressure sensor 15. The control unit 16 acquires information on the aircraft 1, and the information on the aircraft 1 includes, for example, a fuselage weight based on the remaining amount of fuel in the aircraft 1, a navigation speed (Mach number) of the aircraft 1, an attack angle of the aircraft 1, and a fuselage altitude of the aircraft 1.

The control unit 16 calculates a lift coefficient (CL) on the basis of the information on the aircraft 1. The control unit 16 performs the control of the displacing unit 14 on the basis of the calculated lift coefficient and the detection result of the temperature pressure sensor 15. Note that when performing the control of the displacing unit 14, the control unit 16 sets a preset setting range of the lift coefficient. The setting range is obtained in advance by analysis, experimentation, or the like, and is a range of the lift coefficient in which the shock wave is generated. Then, the control unit 16 performs the control of the displacing unit 14 on the basis of the preset setting range of the lift coefficient and the calculated lift coefficient CL.

When the calculated lift coefficient CL is within the preset setting range of the lift coefficient, the control unit 16 controls the displacing unit 14 to cause the bump cover 13 to be deformed to protrude outward from the upper blade surface 3a, while in the case of outside of the setting range, controls the displacing unit 14 to cause the bump cover 13 to follow the upper blade surface 3a. In other words, when the calculated lift coefficient is within the preset setting range of the lift coefficient, the control unit 16 opens the on-off valve 22 to heat and deform the push-up member 18 with the heating fluid to cause the bump cover 13 to be in the deformed state. At this time, the control unit 16 calculates, based on the temperature detected by the temperature pressure sensor 15, a supply amount of the heating fluid so as to correspond to the amount of heat required for deforming the push-up member 18, and controls the on-off valve 22 so as to be a degree of opening corresponding to the calculated supply amount.

On the other hand, when the calculated lift coefficient is outside of the preset setting range of the lift coefficient, the control unit 16 closes the on-off valve 22 to stop heating the push-up member 18 with the heating fluid, causes the push-up member 18 to transform to the state before deformation, and causes the bump cover 13 to transform to the steady state by the restoring force of the bump cover 13.

Figure 7:
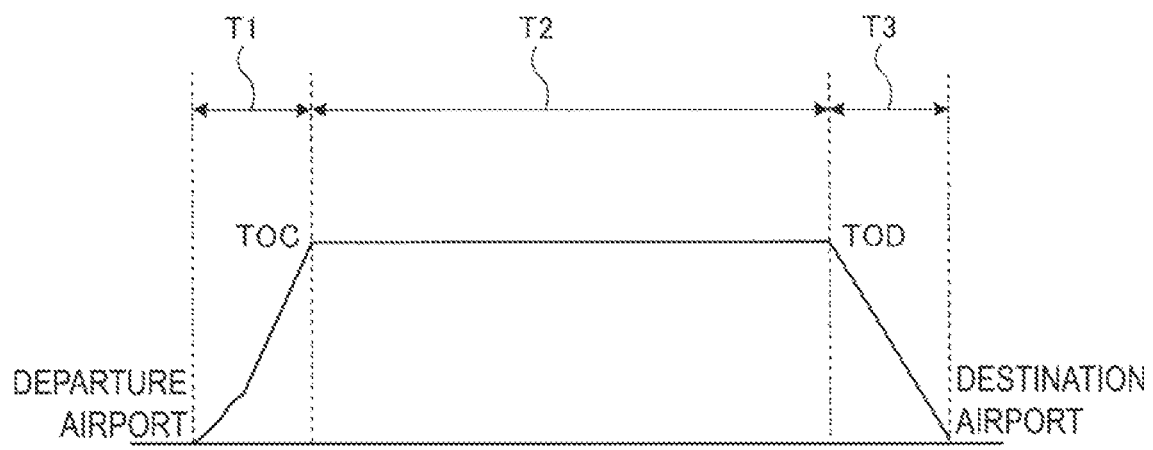
FIG. 7 is a graph of a time chart relating to control of the shock wave suppression device according to the first embodiment.

Next, with reference to FIG. 7, the control of the displacing unit 14 by the control unit 16 will be described. FIG. 7 is a graph of a time chart relating to the control of the shock wave suppression device according to the first embodiment. The aircraft 1 performs takeoff and climb flight operation in a predetermined time period T1 from the aircraft 1 takes off from a departure airport until the aircraft 1 reaches a predetermined cruising altitude, which is Top of Climb (TOC), after taking off. Then, the aircraft 1 performs a cruising operation for cruising at a predetermined cruising altitude in a predetermined time period T2. When reaching a predetermined cruising altitude, which is Top of Descent (TOD), the aircraft 1 performs landing and descending operation and lands on a destination airport in a predetermined time period T3.

The control unit 16 controls the displacing unit 14 in the time period T2 during which the cruising operation is performed. As described above, when the calculated lift coefficient is within the setting range, the control unit 16 sets the bump cover 13 in the deformed state and, in the case of outside of the setting range, sets the bump cover 13 in the steady state. Note that the control of the displacing unit 14 is not particularly limited to the control described above. During the time period T2 during which the cruising operation is performed, the bump cover 13 may be always set in the deformed state, and in the time periods T1 and T3, the bump cover 13 may be set in the steady state. In the first embodiment, the control of the displacing unit 14 is performed automatically, but may be performed manually.

Second Embodiment

Figure 8:
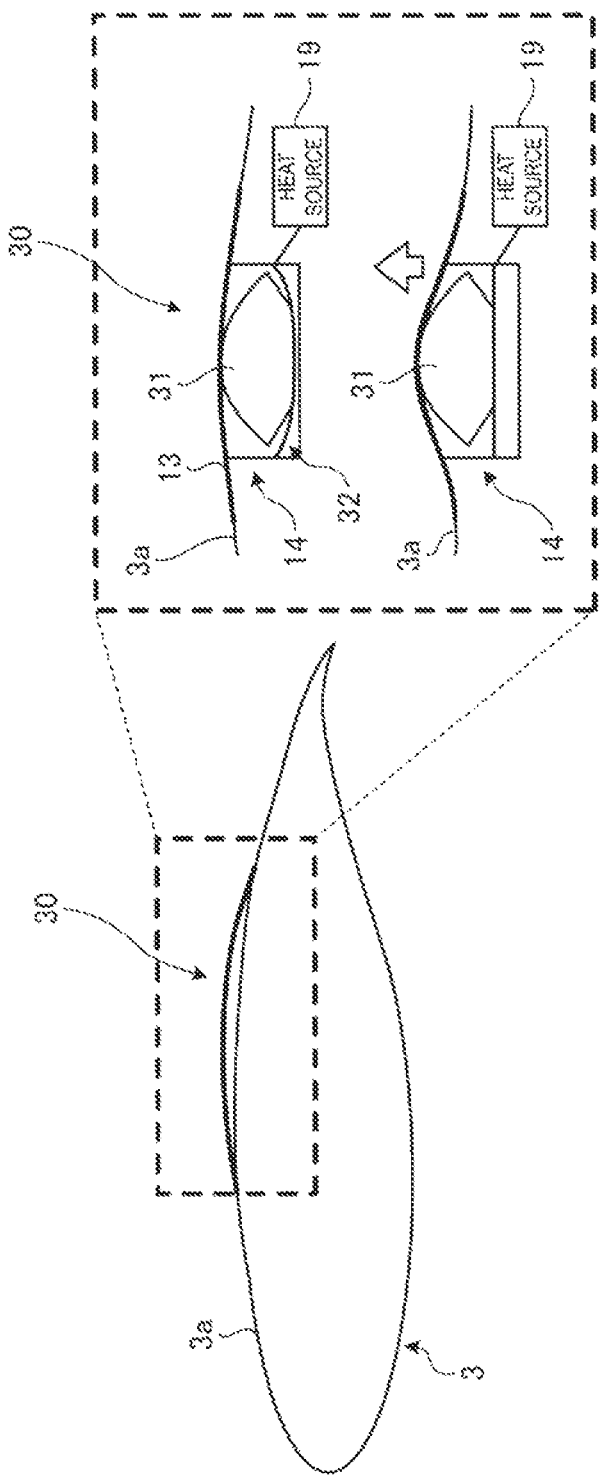
FIG. 8 is a cross-sectional view schematically illustrating an example of a shock wave suppression device according to a second embodiment.

Next, with reference to FIG. 8, a shock wave suppression device 30 according to the second embodiment is described. In the second embodiment, in order to avoid redundant descriptions, descriptions will be given only for structural elements different from those of the first embodiment, and the same reference numerals will be assigned to structural elements having the same configuration as that of the first embodiment. FIG. 8 is a cross-sectional view schematically illustrating an example of the shock wave suppression device according to the second embodiment.

As illustrated in FIG. 8, in the shock wave suppression device 30 according to the second embodiment, the displacing unit 14 has a different configuration from that of the first embodiment. Specifically, the displacing unit 14 includes a contact member 31, a push-up member 32, and a heat source 19.

The contact member 31 is provided in contact with a surface on the inside of the bump cover 13. The contact member 31 has a curved shape in which an upper surface facing the bump cover 13 is convex to the bump cover 13 side from the leading edge side toward the trailing edge side, and deforms the bump cover 13 into a shape in the deformed state. The contact member 31 is formed using, for example, a titanium alloy, a stainless steel or an aluminum alloy.

Similar to the push-up member 18 of the first embodiment, the push-up member 32 has a configuration to include a shape memory material configured to deform by being heated. the push-up member 32 deforms, by being heated, so as to push up the contact member 31 toward the bump cover 13, so that the bump cover 13 is in a deformed state. The push-up member 32 pushes up the contact member 31 to deform the hump cover 13 to follow the upper face of the contact member 31. On the other hand, the push-up member 32 transforms to a shape before deformation, by being cooled, so as to retract the contact member 31 from the bump cover 13, so that the bump cover 13 is allowed to return to the steady state.

Third Embodiment

Figure 9:
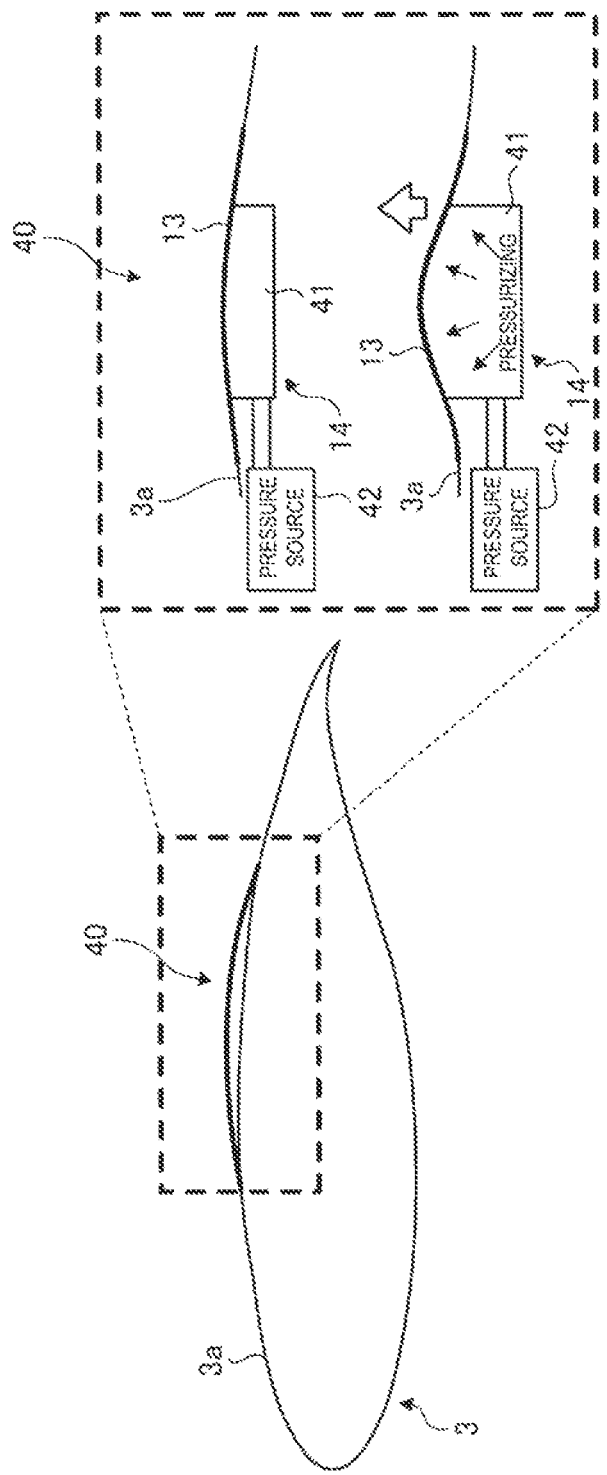
FIG. 9 is a cross-sectional view schematically illustrating an example of a shock wave suppression device according to a third embodiment.

Next, with reference to FIG. 9, a shock wave suppression device 40 according to a third embodiment is described. In the third embodiment, in order to avoid redundant descriptions, descriptions will be given only for structural elements different from those of the first and second embodiments, and the same reference numerals will be assigned to structural elements having the same configuration as that of the first embodiment. FIG. 9 is a cross-sectional view schematically illustrating an example of a shock wave suppression device according to the third embodiment.

As illustrated in FIG. 9, in the shock wave suppression device 40 according to the third embodiment, the displacing unit 14 has a different configuration from that of the first embodiment. Specifically, the displacing unit 14 includes a pressurizing chamber 41 and a pressurizing source 42.

The pressurizing chamber 41 is provided in contact with the inside of the bump cover 13. In other words, the bump cover 13 constitutes a part of the pressurizing chamber 41. A pressurizing source 42 is connected to the pressurizing chamber 41 via piping. The pressurizing source 42 is a pressurizing fluid extracted from the gas turbine engine 5. In other words, the pressurizing source 42 is the same as the heat source 19 of the first embodiment, and is a pressurizing fluid supplied to the pressurizing chamber 41 via the air extraction line 21, which is connected to the pressurizing chamber 41.

The shock wave suppression device 40 pressurizes the interior of the pressurizing chamber 41 by opening the on-off valve 22 to cause the pressurizing fluid to flow into the pressurizing chamber 41. When the pressure inside the pressurizing chamber 41 increases, the bump cover 13 deforms from the steady state to the deformed state by the pressure. On the other hand, the shock wave suppression device 40 decreases the pressure of interior of the pressurizing chamber 41 by closing the on-off valve 22 to cause the pressurizing fluid to flow out of an opening (not illustrated) of the pressurizing chamber 41, so that the bump cover 13 transforms from the deformed state to the steady state by the restoring force of the bump cover 13.

Note that when the bump cover 13 is deformed, the trailing edge side of the bump cover 13 slides by the sliding mechanism unit 17, and thus a sealing function may be added to the sliding mechanism unit 17 so that the pressurizing fluid does not leak from the pressurizing chamber 41 via the sliding mechanism unit 17.

As described above, the shock wave suppression devices 10, 30, 40 and the aircraft 1 according to the first to third embodiments are grasped as follows, for example.

The shock wave suppression devices 10, 30, and 40 according to a first aspect are configured to suppress the shock wave generated on the blade surface of the blade (upper blade surface 3a), the shock wave suppression devices including the bump cover 13 provided to follow the blade surface and deformable to protrude outward from the blade surface, and the displacing unit 14 configured to displace the bump cover 13 between the steady state to follow the blade surface and the deformed state to protrude outward from the blade surface.

According to the configuration, the displacing unit 14 can cause the bump cover 13 to transform between the steady state and the deformed state. Thus, when the shock wave is not generated, the drag to the blade (drag coefficient CD) can be reduced by setting the bump cover 13 in the steady state. On the other hand, when the shock wave is generated, an increase in drag due to the shock wave generated on the blade surface can be suppressed by setting the bump cover 13 in the deformed state.

As a second aspect, the bump cover has a curved shape in the deformed state configured to be a continuous surface from the upstream side to the downstream side in the flow direction of the fluid flowing through the blade surface.

According to the configuration, the bump cover 13 can be made to have a shape suitable for suppressing the shock wave.

As a third aspect, the bump cover 13 is the plate material using the elastic alloy.

According to the configuration, since the bump cover 13 can be formed using the elastic alloy, the bump cover 13 can be suitably changed from the steady state to the deformed state even in a case where the drag force due to the fluid flowing through the blade surface is large. Additionally, since the bump cover 13 can be transformed from the deformed state to the steady state by the restoring force of the bump cover 13, the configuration can be made simple.

As a fourth aspect, in the bump cover, a portion on the upstream side in the flow direction of the fluid flowing through the blade surface is fixed to the blade surface, and a portion on the downstream side is slidably connected to the blade surface.

According to the configuration, since the portion on the downstream side of the bump cover 13 can be slidable, the bump cover 13 can be suitably allowed to be deformed.

As a fifth aspect, the displacing unit 14 includes the push-up member 18 including the shape memory material configured to deform the bump cover 13 by being heated and the heat source 19 configured to heat the push-up member 18.

According to the configuration, the bump cover 13 can be deformed from the steady state to the deformed state with the simple configuration in which the push-up member 18 is heated by the heat source 19.

As a sixth aspect, the push-up member 18 has a coil shape after deformation deformed by being heated with the heat source 19.

According to the configuration, the bump cover 13 can be suitably deformed by expanding the push-up member 18.

As a seventh aspect, the push-up member 18 has a spiral shape after deformation deformed by being heated with the heat source.

According to the configuration, the bump cover 13 can be suitably deformed by expanding the push-up member 18.

As an eighth aspect, the push-up member 18 has a shape after deformation deformed by being heated with the heat source 19, the shape being configured to follow a surface on the inside of the protruding bump cover 13.

According to the configuration, the bump cover 3 can be suitably deformed by deforming the push-up member 18.

As a ninth aspect, the displacing unit 14 includes the contact member 31 configured to be in contact with the inside of the bump cover 13, the push-up member 32 including the shape memory alloy configured to deform by being heated to move the contact member 31 toward the bump cover 13, and the heat source 19 configured to heat the push-up member 32.

According, to the configuration, the bump cover 13 can be accurately deformed to follow the contact member 31 by heating the push-up member 32 with the heat source 19.

As a tenth aspect, the heat source 19 is a heating fluid extracted from an engine (gas turbine engine 5) provided to the aircraft 1.

According to the configuration, since the heating fluid extracted from the engine can be used, the configuration can be simplified without providing a new heat source.

As an eleventh aspect, the displacing unit 14 includes the pressurizing chamber 41 provided in contact with the bump cover 13, and the pressurizing source 42 configured to deform the bump cover 13 by pressurizing the inside of the pressurizing chamber 41.

According to the configuration, the bump cover 13 can be deformed with the simple configuration by pressurizing the inside of the pressurizing chamber 41 with the pressurizing source 42.

As a twelfth aspect, the pressurizing source 42 is a pressurizing fluid extracted from the engine (gas turbine engine 5) provided to the aircraft 1.

According to the configuration, since the pressurizing fluid extracted from the engine can be used, the configuration can be simplified without providing a new pressure source.

As a thirteenth aspect, each of the shock wave suppression devices further includes the control unit 16 configured to control the displacing unit 14, the control unit 16 calculating a lift coefficient on the basis of information on the aircraft 1, and when the calculated lift coefficient is within the preset setting range of the lift coefficient, the control unit 16 controlling the displacing unit 14 to cause the bump cover 13 to be deformed to protrude outward from the blade surface, while in the case of outside of the setting range, the control unit 16 controlling the displacing unit 14 to cause the bump cover 13 to follow the blade surface.

According to the configuration, when the lift coefficient is within the setting range, a drag increase to the blade due to the shock wave can be suppressed by setting the bump cover 13 in the deformed state, and when the lift coefficient is outside of the setting range of the lift coefficient, the drag to the blade can be reduced by setting the bump cover 13 in the steady state.

An aircraft 1 according to a fourteenth aspect includes the fuselage 2, the blade body (main wing 3) provided to the fuselage 2, and above-described shock wave suppression devices 10, 30, and 40 provided to the blade surface of the blade body.

According to the configuration, since the drag on the blade surface can be suitably reduced, the aircraft 1 can be made improved fuel economy efficiency.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A shock wave suppression device for suppressing a shock wave generated on a blade surface of a blade, the shock wave suppression device comprising:
   a bump cover provided to follow the blade surface and being deformable to protrude outward from the blade surface; and
   a displacing unit configured to displace the bump cover between a steady state to follow the blade surface and a deformed state to protrude outward from the blade surface,
   wherein:
   a leading edge side of the bump cover is fixed to the blade surface; and
   a trailing edge side of the bump cover is connected to the blade surface via a sliding mechanism unit.

2. The shock wave suppression device according to claim 1,
   wherein the bump cover has a curved shape in the deformed state configured to be a continuous surface from an upstream side to a downstream side in a flow direction of a fluid on the blade surface.

3. The shock wave suppression device according to claim 2,
   wherein the bump cover is a plate material including an elastic alloy.

4. The shock wave suppression device according to claim 2,
   wherein the displacing unit includes:
   a push-up member including a shape memory material configured to deform the bump cover by being heated; and
   a heat source configured to heat the push-up member.

5. The shock wave suppression device according to claim 2,
   wherein the displacing unit includes:
   a contact member configured to be in contact with an inside of the bump cover;
   a push-up member including a shape memory alloy configured to deform by being heated to move the contact member toward the bump cover; and
   a heat source configured to heat the push-up member.

6. The shock wave suppression device according to claim 1,
   wherein the bump cover is a plate material including an elastic alloy.

7. The shock wave suppression device according to claim 6,
   wherein the displacing unit includes:
   a push-up member including a shape memory material configured to deform the bump cover by being heated; and
   a heat source configured to heat the push-up member.

8. The shock wave suppression device according to claim 1,
   wherein the displacing unit includes:
   a push-up member including a shape memory material configured to deform the bump cover by being heated; and
   a heat source configured to heat the push-up member.

9. The shock wave suppression device according to claim 8,
   wherein the push-up member has a coil shape after deformation by being heated with the heat source.

10. The shock wave suppression device according to claim 8,
    wherein the push-up member has a spiral shape after deformation by being heated with the heat source.

11. The shock wave suppression device according to claim 8,
    wherein, after deformation by being heated with the heat source, the push-up member has a shape configured to follow a surface on an inside of the bump cover which protrudes outward from the blade surface.

12. The shock wave suppression device according to claim 8,
    wherein the heat source is a heating fluid extracted from an engine provided to an aircraft.

13. The shock wave suppression device according to claim 1,
    wherein the displacing unit includes:
    a contact member configured to be in contact with an inside of the bump cover;
    a push-up member including a shape memory alloy configured to deform by being heated to move the contact member toward the bump cover; and
    a heat source configured to heat the push-up member.

14. The shock wave suppression device according to claim 1,
    wherein the displacing unit includes:
    a pressurizing chamber in contact with the bump cover; and
    a pressurizing source configured to deform the bump cover by pressurizing an inside of the pressurizing chamber.

15. The shock wave suppression device according to claim 14,
    wherein the pressurizing source is a pressurizing fluid extracted from an engine provided to an aircraft.

16. The shock wave suppression device according to claim 15,
    wherein the sliding mechanism unit is configured to provide a sealing function so that the pressurizing fluid does not leak from the pressurizing chamber via the sliding mechanism unit.

17. The shock wave suppression device according to claim 1, further comprising
a control unit,
wherein the control unit is configured to:
calculate a lift coefficient based on information on an aircraft; and
control the displacing unit to cause the bump cover to: (i) be deformed to protrude outward from the blade surface when the lift coefficient is within a setting range of the lift coefficient; and (ii) follow the blade surface when the lift coefficient is outside the setting range of the lift coefficient.

18. The shock wave suppression device according to claim 1,
wherein the sliding mechanism unit is a linear slider configured to extend in a blade width direction connecting a leading edge side of the blade and a trailing edge side of the blade.

19. The shock wave suppression device according to claim 1, further comprising
an occlusion member configured to occlude a gap between the bump cover in the deformed state and the blade surface.

20. An aircraft comprising:
a fuselage;
a blade provided to the fuselage; and
the shock wave suppression device according to claim 1,
wherein the shock wave suppression device is provided to the blade surface of the blade.

* * * * *